(12) United States Patent
Hoshuyama (10) Patent No.: US 8,059,904 B2
(45) Date of Patent: Nov. 15, 2011

(54) IMAGE-PROCESSING DEVICE, ELECTRONIC CAMERA, IMAGE-PROCESSING PROGRAM, AND IMAGE-PROCESSING METHOD

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 718 days.

(21) Appl. No.: 10/733,264

(22) Filed: Dec. 12, 2003

(65) Prior Publication Data
US 2004/0234155 A1 Nov. 25, 2004

(30) Foreign Application Priority Data
Dec. 18, 2002 (JP) .................................. 2002-366299

(51) Int. Cl.
*G06K 9/40* (2006.01)
(52) U.S. Cl. .................. 382/254; 382/255; 348/229
(58) Field of Classification Search .................. 382/254, 382/167; 358/1.2; 396/225
See application file for complete search history.

(56) References Cited

U.S. PATENT DOCUMENTS

| | | | | |
|---|---|---|---|---|
| 4,677,576 A * | 6/1987 | Berlin et al. | | 345/420 |
| 5,710,877 A * | 1/1998 | Marimont et al. | | 345/427 |
| 5,768,438 A * | 6/1998 | Etoh | | 382/251 |
| 5,872,902 A * | 2/1999 | Kuchkuda et al. | | 345/615 |
| 5,901,252 A * | 5/1999 | Kawakami et al. | | 382/276 |
| 5,909,242 A * | 6/1999 | Kobayashi et al. | | 348/208.3 |
| 6,005,984 A * | 12/1999 | Kawakami et al. | | 382/276 |
| 6,122,076 A | 9/2000 | Shiota | | |
| 6,333,792 B1 * | 12/2001 | Kimura | | 358/1.2 |
| 6,388,709 B1 * | 5/2002 | Kobayashi et al. | | 348/362 |
| 6,487,309 B1 * | 11/2002 | Chen | | 382/162 |
| 6,831,696 B1 | 12/2004 | Saeki | | |
| 6,927,874 B1 * | 8/2005 | Enokida et al. | | 358/1.18 |
| 7,551,791 B2 * | 6/2009 | Poon et al. | | 382/254 |
| 2001/0003557 A1 * | 6/2001 | Hirai et al. | | 396/225 |
| 2002/0025079 A1 * | 2/2002 | Kuwata et al. | | 382/254 |
| 2002/0051569 A1 * | 5/2002 | Kita | | 382/167 |
| 2002/0102029 A1 * | 8/2002 | Sekiguchi et al. | | 382/243 |
| 2005/0123211 A1 * | 6/2005 | Wong et al. | | 382/254 |
| 2005/0232476 A1 * | 10/2005 | Hayakawa et al. | | 382/141 |
| 2005/0244053 A1 * | 11/2005 | Hayaishi | | 382/164 |
| 2006/0078217 A1 * | 4/2006 | Poon et al. | | 382/255 |
| 2006/0204120 A1 * | 9/2006 | Poon et al. | | 382/254 |
| 2008/0225136 A1 * | 9/2008 | Yamada | | 348/229.1 |

FOREIGN PATENT DOCUMENTS

EP 632649 A1 * 1/1995

(Continued)

*Primary Examiner* — Anand Bhatnagar
*Assistant Examiner* — Tsung-Yin Tsai
(74) *Attorney, Agent, or Firm* — Oliff & Berridge, PLC (57) ABSTRACT

An image-processing device of the invention can appropriately correct a gradation of an image to be processed in accordance with the image. Thus, it divides the image into plural small areas; generates image information indicating a characteristic of the image for each small area; determines an evaluation value indicating luminosity of each pixel constituting the image, according to the image information generated for each small area and image information generated for each of adjacent small areas to the each small area; and performs an image processing on each pixel of the image according to the determined evaluation value. A digital still camera of the invention can appropriately correct a gradation of an image created by shooting in accordance with the image. Moreover, an image-processing program and an image-processing method of the invention realize appropriate gradation correction in accordance with an image to be processed.

8 Claims, 12 Drawing Sheets

$P_x = p_1 \cdot (1-\alpha) \cdot (1-\beta) + p_2 \cdot \alpha \cdot (1-\beta) + p_3 \cdot (1-\alpha) \cdot \beta + p_4 \cdot \alpha \cdot \beta$

FOREIGN PATENT DOCUMENTS

| | | |
|---|---|---|
| JP | 11164190 A * | 6/1999 |
| JP | A 2001-54014 | 2/2001 |
| JP | A-2001-136433 | 5/2001 |
| JP | A-2002-016793 | 1/2002 |
| JP | A-2002-140700 | 5/2002 |
| JP | A-2002-304680 | 10/2002 |
| JP | 2003333631 A * | 11/2003 |

* cited by examiner

FIG. 1

DIGITAL STILL CAMERA 1

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 12 | 12 | 12 | 12 | 12 | 10 | 12 | 12 | 12 | 5 | 4 | 3 | 4 | 7 | 14 | 16 |
| 2 | 12 | 12 | 10 | 6 | 12 | 8 | 12 | 12 | 9 | 11 | 3 | 2 | 1 | 7 | 15 | 15 |
| 3 | 7 | 7 | 7 | 5 | 7 | 5 | 11 | 12 | 10 | 10 | 10 | 10 | 1 | 6 | 14 | 15 |
| 4 | 2 | 3 | 2 | 3 | 2 | 3 | 11 | 12 | 8 | 10 | 10 | 10 | 2 | 5 | 12 | 12 |
| 5 | 2 | 3 | 2 | 4 | 2 | 4 | 10 | 12 | 7 | 10 | 10 | 10 | 1 | 3 | 12 | 12 |
| 6 | 2 | 3 | 2 | 2 | 2 | 4 | 9 | 10 | 6 | 10 | 11 | 10 | 9 | 12 | 12 | 12 |
| 7 | 2 | 3 | 2 | 2 | 2 | 4 | 6 | 2 | 12 | 10 | 10 | 10 | 10 | 11 | 12 | 12 |
| 8 | 2 | 3 | 2 | 2 | 2 | 4 | 2 | 2 | 10 | 10 | 10 | 9 | 10 | 12 | 10 | 11 |
| 9 | 2 | 3 | 2 | 2 | 2 | 2 | 2 | 2 | 10 | 10 | 10 | 10 | 10 | 10 | 10 | 10 |
| 10 | 2 | 3 | 2 | 2 | 2 | 2 | 2 | 2 | 10 | 10 | 10 | 10 | 10 | 10 | 10 | 10 |

| P | 1 | 2 | 3 | 4 | 5 | 6 | 7 | 8 | 9 |
|---|---|---|---|---|---|---|---|---|---|
| Kc1 | 1.1 | 1.1 | 1.2 | 1.3 | 1.4 | 1.4 | 1.5 | 1.5 | 1.5 |
| Kc2 | 0.2 | 0.2 | 0.2 | 0.3 | 0.3 | 0.3 | 0.4 | 0.4 | 0.4 |
| Kc3 | −0.1 | −0.1 | −0.2 | −0.3 | −0.4 | −0.5 | −0.5 | −0.5 | −0.5 |
| . | . | . | . | . | . | . | . | . | . |
| . | . | . | . | . | . | . | . | . | . |
| . | . | . | . | . | . | . | . | . | . |
| Kc9 | −0.1 | −0.1 | −0.2 | −0.3 | −0.4 | −0.5 | −0.5 | −0.5 | −0.5 |

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 5 | 5 | 4 | 4 | 4 | 4 | 3 | 3 | 3 | 3 | 4 | 4 | 4 | 4 | 5 | 5 |
| 2 | 5 | 4 | 4 | 4 | 4 | 3 | 3 | 3 | 3 | 3 | 3 | 4 | 4 | 4 | 4 | 5 |
| 3 | 4 | 4 | 4 | 4 | 3 | 3 | 3 | 3 | 3 | 3 | 3 | 3 | 4 | 4 | 4 | 4 |
| 4 | 4 | 4 | 4 | 3 | 3 | 3 | 3 | 2 | 2 | 3 | 3 | 3 | 3 | 4 | 4 | 4 |
| 5 | 4 | 4 | 4 | 3 | 3 | 3 | 2 | 2 | 2 | 2 | 3 | 3 | 3 | 4 | 4 | 4 |
| 6 | 4 | 4 | 4 | 3 | 3 | 3 | 2 | 2 | 2 | 2 | 3 | 3 | 3 | 4 | 4 | 4 |
| 7 | 4 | 4 | 4 | 3 | 3 | 3 | 3 | 2 | 2 | 3 | 3 | 3 | 3 | 4 | 4 | 4 |
| 8 | 4 | 4 | 4 | 4 | 3 | 3 | 3 | 3 | 3 | 3 | 3 | 3 | 4 | 4 | 4 | 4 |
| 9 | 5 | 4 | 4 | 4 | 4 | 3 | 3 | 3 | 3 | 3 | 3 | 4 | 4 | 4 | 4 | 5 |
| 10 | 5 | 5 | 4 | 4 | 4 | 4 | 3 | 3 | 3 | 3 | 4 | 4 | 4 | 4 | 5 | 5 |

IMAGE-PROCESSING DEVICE, ELECTRONIC CAMERA, IMAGE-PROCESSING PROGRAM, AND IMAGE-PROCESSING METHOD

CROSS REFERENCE TO RELATED APPLICATION

This application is based upon and claims the benefit of priority from Japanese Patent Application No. 2002-366299, filed on Dec. 18, 2002, the entire contents of which are incorporated herein by reference.

BACKGROUND OF THE INVENTION

1. Field of the Invention

The present invention relates to an image-processing device, an electronic camera, an image-processing program, and an image-processing method for correcting a luminance level of an image to be processed.

2. Description of the Related Art

Some digital still cameras perform various image processings on generated image data to achieve the function of an image-processing device. The image processings include: white balance adjustment; an interpolation processing; a color correction processing; a gradation correction processing; and the like. The gradation correction processing is generally realized by performing a gamma processing.

However, for an image to be processed (an image generated by a digital still camera) with a large difference in luminance, the conventional gamma processing may cause loss of gradation in the highlight and shadow areas of the image because it is uniformly performed on the entire image, which results in depriving characteristics of details of the image. Moreover, in the case where the image to be processed has a small difference in luminance, the gamma processing may degrade contrast of the entire image, and make the image weak in gradation.

SUMMARY OF THE INVENTION

It is a first object of the invention to provide an image-processing device capable of appropriate gradation correction in accordance with an image to be processed.

It is a second object of the invention to provide a digital still camera capable of appropriate gradation correction in accordance with an image created by shooting.

It is a third object of the invention to provide an image-processing program for realizing appropriate gradation correction in accordance with an image to be processed.

It is a fourth object of the invention to provide an image-processing method for realizing appropriate gradation correction in accordance with an image to be processed.

In order to achieve the first object described above, the image-processing device according to the present invention includes: an image information generating part for dividing an image to be processed into a plurality of small areas and for generating, for each of the small areas, image information indicating a characteristic of the image; an evaluation value determining part for determining an evaluation value indicating luminosity of each of pixels constituting the image, according to the image information generated for each of the small areas and the image information generated for each of small areas adjacent to the each of the small areas; and an image-processing part for performing an image processing on each of the pixels of the image, according to the evaluation value determined by the evaluation value determining part.

In order to achieve the second object described above, the digital still camera according to the present invention includes an image-capturing part for capturing a subject to generate an image; an image information generating part for dividing the image generated by the image-capturing part and for generating, for each of the small areas, image information indicating a characteristic of the image; an evaluation value determining part for determining an evaluation value indicating luminosity of each of pixels constituting the image, according to the image information generated for each of the small areas and the image information generated for each of small areas adjacent to the each of the small areas; and an image-processing part for performing an image processing on each of the pixels of the image, according to the evaluation value determined by the evaluation value determining part.

In order to achieve the third object described above, the program for realizing control of an image-processing device with a computer according to the present invention includes: an image information generating step of dividing an image to be processed into a plurality of small areas to generate for each of the small areas image information indicating a characteristic of areas of the image; an evaluation value determining step of determining an evaluation value indicating luminosity of each of pixels constituting the image, according to the image information generated for each of the small areas and image information generated for each of small areas adjacent to the each of the small areas; and an image-processing step of performing an image processing on each of the pixels of the image according to the evaluation value determined in the evaluation value determining step.

In order to achieve the fourth object described above, the image-processing method according to the present invention includes: an image information generating step of dividing an image to be processed into a plurality of small areas to generate for each of the small areas image information indicating a characteristic of the image; an evaluation value determining step of determining an evaluation value indicating luminosity of each of pixels constituting the image, according to the image information generated for each of the small areas and image information generated for each of small areas adjacent to the each of the small areas; and an image-processing step of performing an image processing on each of the pixels of the image according to the evaluation value determined in the evaluation value determining step.

DESCRIPTION OF THE PREFERRED EMBODIMENTS

Hereinafter, preferred embodiments of the present invention will be described in detail with reference to the accompanying drawings.

In each of the following embodiments, the description will be made for a digital still camera having the function of image processing performed by an image-processing device according to the present invention.

First Embodiment

Hereinafter, a first embodiment of the present invention will be described with reference to the drawings.

Figure 1:
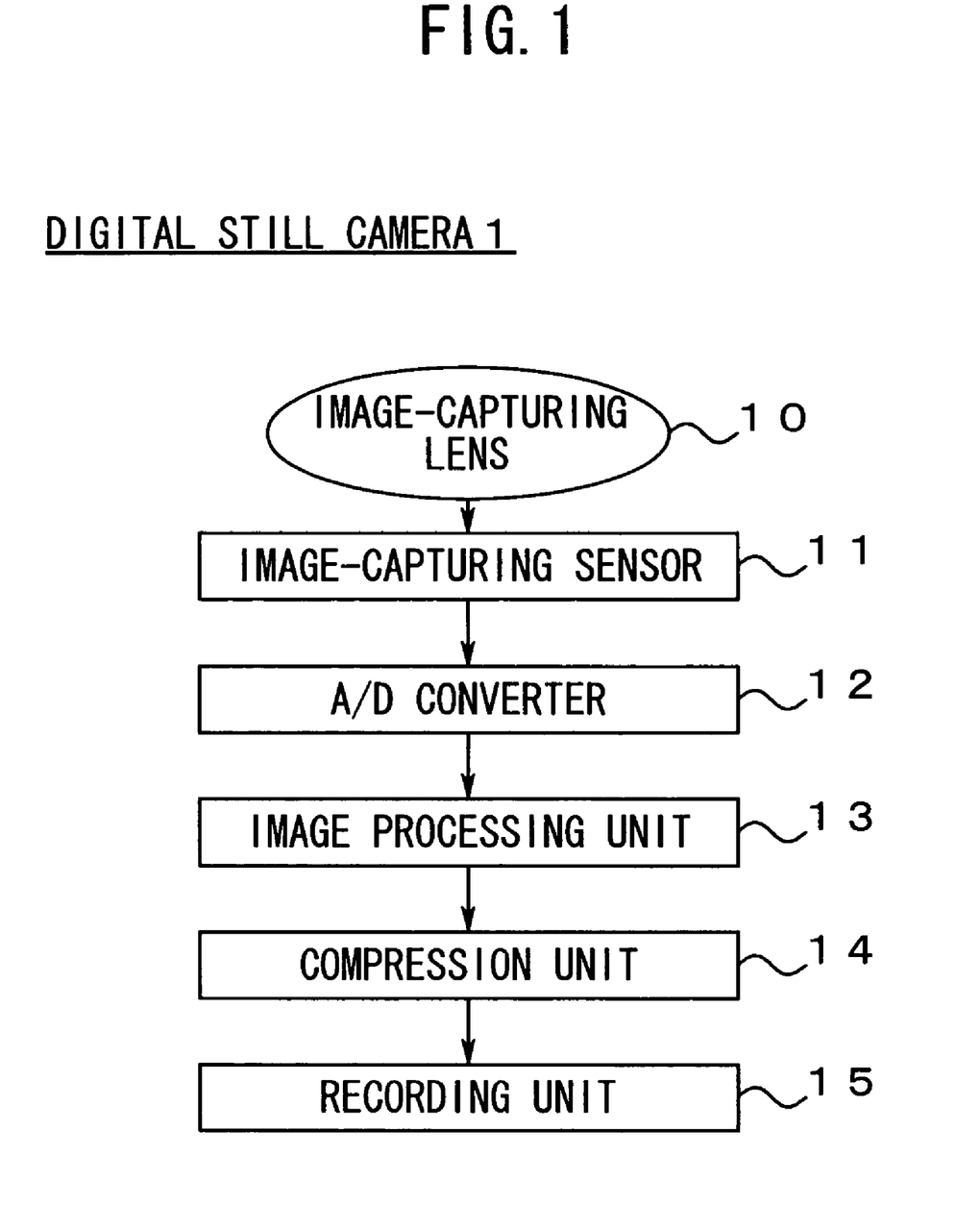
FIG. 1 is a diagram showing a schematic configuration of a digital still camera according to a first embodiment of the present invention.

FIG. 1 is a diagram showing a schematic structure of a digital still camera according to the first embodiment.

In FIG. 1, a digital still camera 1 includes a photo-taking lens 10, an image sensor 11, an A/D converter 12, an image-processing unit 13, a compression unit 14, and a recording unit 15.

Image data obtained by the photo-taking lens 10 and the image sensor 11 is converted into digital signals in the A/D converter 12. The digital signals are then subjected to image processings in the image-processing unit 13. At the completion of the image processings, the processed image data is output through the compression unit 14 to the recording unit 15.

The image processings in this embodiment include: white balance adjustment; an interpolation processing; a color correction processing; a gamma processing; and a luminance level correction processing which is a characteristic of this embodiment.

A program including the contents of an operation of each unit is pre-recorded in the digital still camera 1. The program may be recorded onto a recording medium or may be downloaded as a transmitted wave through the Internet.

Figure 2:
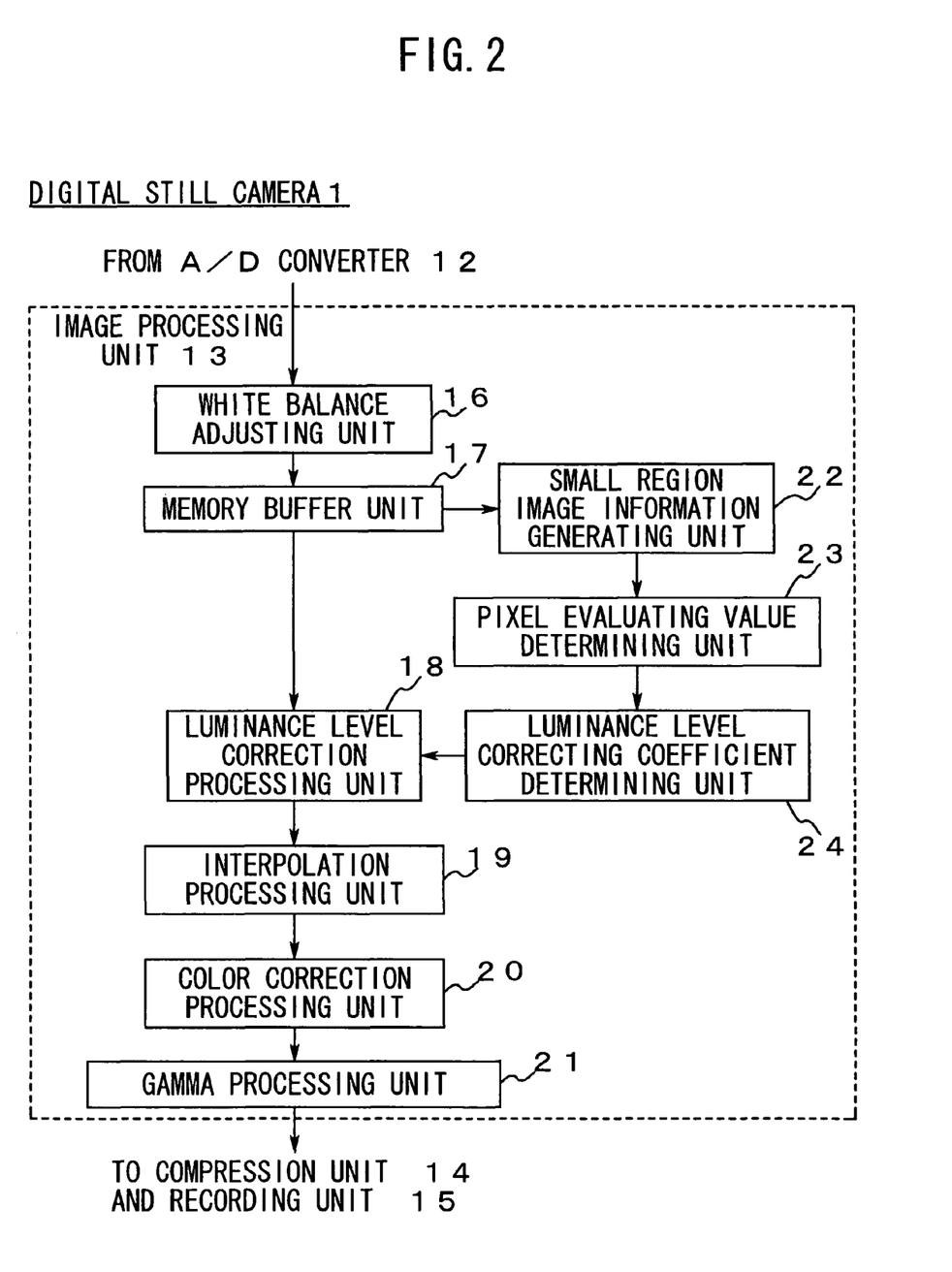
FIG. 2 is a functional block diagram showing an image-processing unit in the digital still camera according to the first embodiment of the present invention.

FIG. 2 is a functional block diagram showing the image-processing unit 13 in the digital still camera 1 according to the first embodiment.

In FIG. 2, the image-processing unit 13 includes a white balance adjusting unit 16, a memory buffer unit 17, a luminance level correction processing unit 18, an interpolation processing unit 19, a color correction processing unit 20, and a gamma processing unit 21. In order to determine a luminance level correcting coefficient used in the luminance level correction processing unit 18, the image-processing unit 13 includes a small area image information generating unit 22, a pixel evaluation value determining unit 23, and a luminance level correcting coefficient determining unit 24.

Hereinafter, an operation of the image-processing unit 13 will be described.

In the image-processing unit 13, the white balance adjusting unit 16 performs white balance adjustment on image data output from the A/D converter 12. Then, the white balance adjustment unit 16 outputs the white-balance adjusted image data to the memory buffer unit 17.

The memory buffer unit 17 stores the white-balance adjusted image data and outputs it to the luminance level correction processing unit 18 and the small area image information generating unit 22 in synchronization with an xy address signal. The memory buffer unit 17 has the function of controlling the output timing according to the xy address signal so as to output the image data to the luminance level correction processing unit 18 and the small area image information generating unit 22 at their respective appropriate timings.

Figure 3:
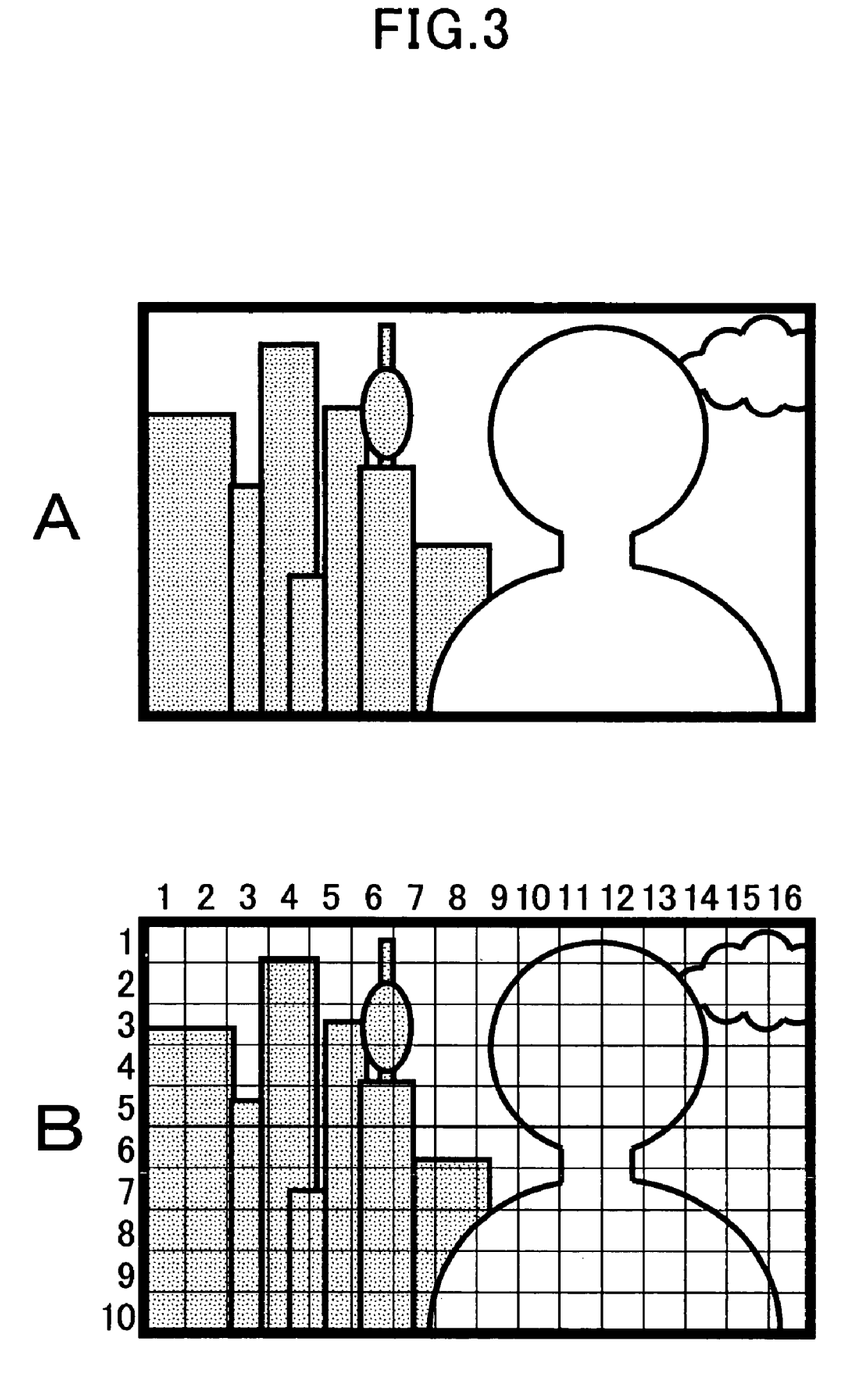
FIG. 3A is a diagram showing an image to be processed.
FIG. 3B is a diagram showing an example where the image to be processed is divided into small areas.

The small area image information generating unit 22 first divides the white-balance adjusted image as shown in FIG. 3A into small areas as shown in FIG. 3B. FIG. 3B shows an example where the image is divided into 10 rows in a vertical direction and 16 columns in a horizontal direction. Next, a predetermined weighted addition processing is performed on image data in each of the divided small area so as to calculate a value indicating luminance information (hereinafter, referred to as a luminance value) representing the small area.

Figure 4:
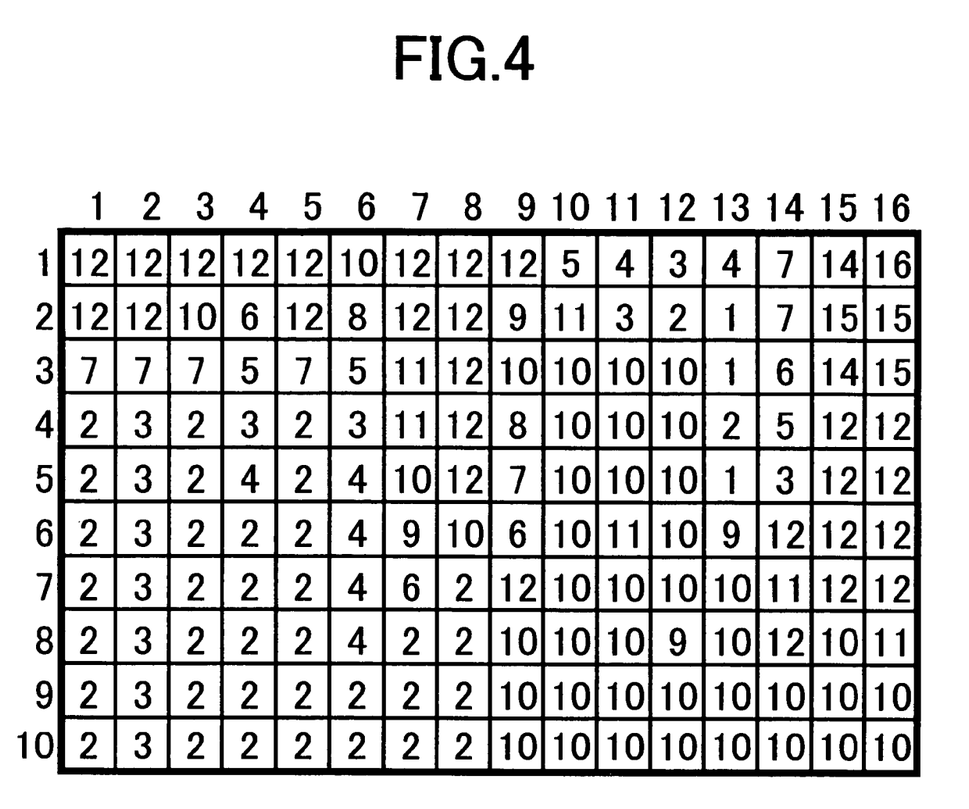
FIG. 4 is a diagram showing a luminance value for each of the small areas.

Luminance values calculated for the respective small areas are shown in FIG. 4. In FIG. 4, the larger the value is, the higher the luminance of the small area is, the smaller the value is, the lower the luminance of the small area is. The small area image information generating unit 22 informs the calculated luminance value of the pixel evaluation value determining unit 23.

The pixel evaluation value determining unit 23 calculates an evaluation value for each pixel according to the luminance value of each small area calculated by the small area image information generating unit 22.

Figure 5:
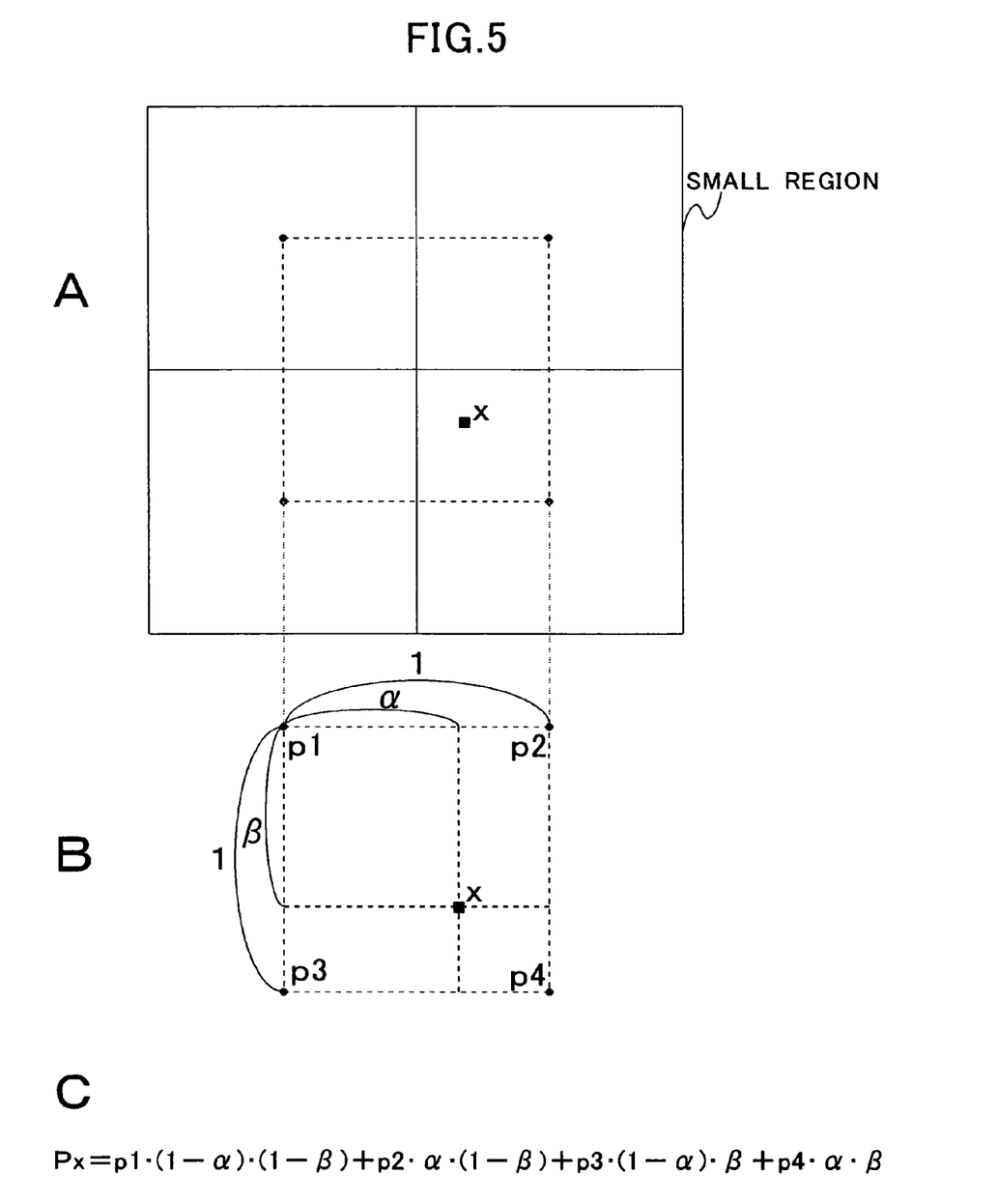
FIG. 5A is a diagram showing an arbitrary pixel X whose evaluation value is to be obtained.
FIG. 5B is an enlarged view showing the vicinity of the arbitrary pixel X whose evaluation value is to be obtained.
FIG. 5c shows a formula for calculating the evaluation value.

FIGS. 5A to 5C illustrate a method of calculating an evaluation value.

For obtaining an evaluation value of an arbitrary pixel X shown in FIG. 5A, the pixel evaluation value determining unit 23 determines distances from the pixel X to the centers of the small areas in the vicinity thereof (including the small area where the pixel X is present) so as to select four small areas having shorter distances to the pixel.

Then, the pixel evaluation value determining unit 23 calculates an evaluation value (Px) of the pixel X according to respective luminance values in the selected four small areas (p1 to p4 in FIG. 5B) and a formula shown in FIG. 5C. The formula shown in FIG. 5C is for calculating the evaluation value by weighting the respective luminance values of the small areas in accordance with the distances from the pixel X to the centers of the small areas.

As described above, evaluation values of pixels in the vicinity are approximately equivalent to each other because the evaluation-value calculation is done for each pixel according to the luminance values of the small areas in the vicinity.

The pixel evaluation value determining unit 23 calculates the evaluation values (P) for all the pixels constituting the image in the above-described manner and then informs the luminance level correcting coefficient determining unit 24 of the calculated evaluation values.

The luminance level correcting coefficient determining unit 24 uses a graph pre-recorded therein to determine a luminance level correcting coefficient for each pixel. Then, the luminance level correcting coefficient determining unit 24 informs the luminance level correction processing unit 18 of the determined luminance level correcting coefficients.

Figure 6:
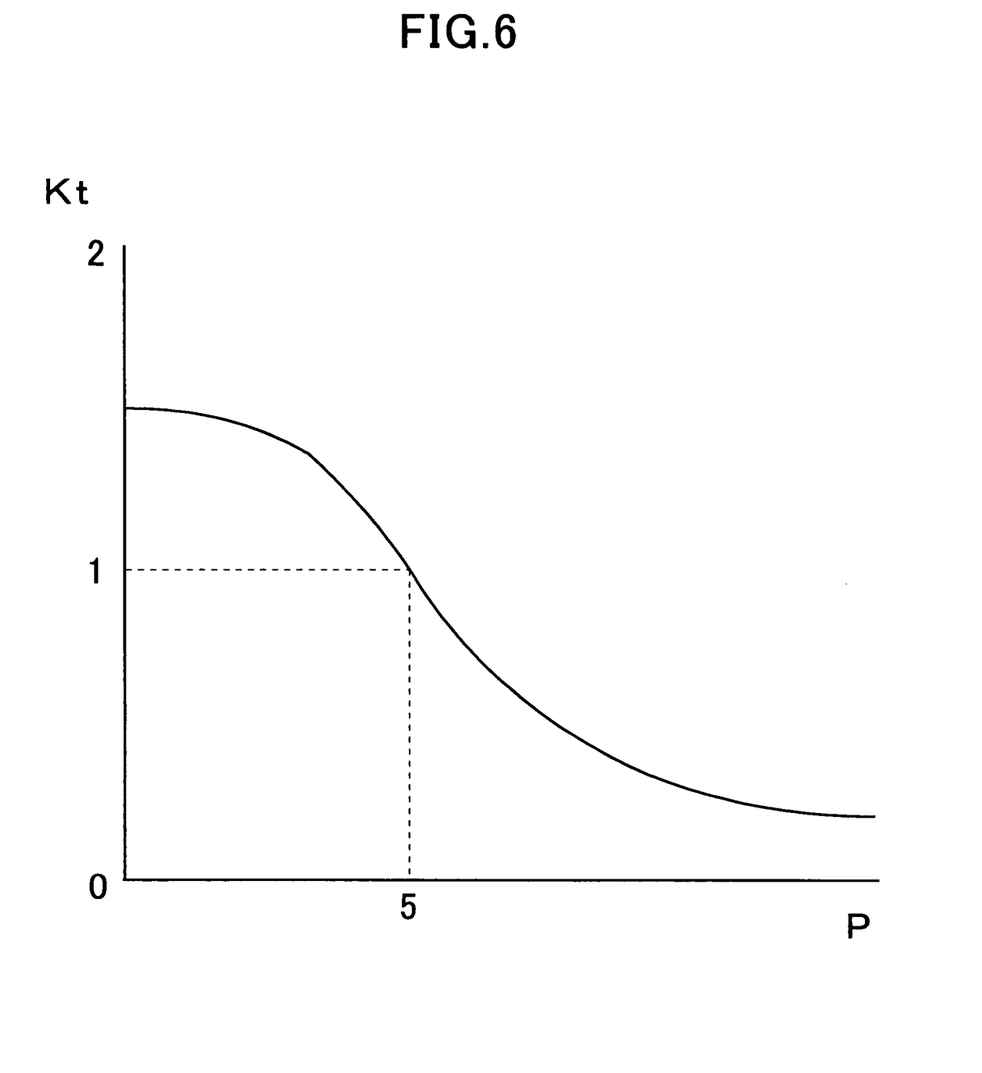
FIG. 6 is a graph used for determining a luminance level correcting coefficient.

FIG. 6 is a graph used for determining the luminance level correcting coefficient. The abscissa axis indicates the evaluation value (P), while the ordinate axis indicates a luminance level correcting coefficient (Kt) correlated with each evaluation value. A value of the luminance level correcting coefficient (Kt) is correlated with the evaluation value (P) in such a manner that the larger the evaluation value (P) is, the smaller the luminance level correcting coefficient (Kt) is, and the smaller the evaluation value (P) is, the larger the luminance level correcting coefficient (Kt) is.

Since evaluation values of the pixels in the vicinity are approximately equivalent to each other as described above, approximately equivalent luminance level correcting coefficients will be determined.

The luminance level correction processing unit 18 uses the luminance level correcting coefficient determined by the luminance level correcting coefficient determining unit 24 to perform a luminance level correction processing on each pixel of the image data output from the memory buffer unit 17. The luminance level correction processing is realized by performing the following operation using the luminance level correcting coefficient (Kt).

$$R' = Kt \times R \quad \text{(Formula 1)}$$

$$G' = Kt \times G \quad \text{(Formula 2)}$$

$$B' = Kt \times B \quad \text{(Formula 3)}$$

Where R, G, and B are image data of each color output from the memory buffer unit 17, and R', G', and B' are image data of each color after the luminance level correction processing.

By such a luminance level correction processing, the larger evaluation value a pixel has, the smaller gain it is to be multiplied by, while the smaller evaluation value a pixel has, the larger gain it is to be multiplied by. Therefore, it is possible to prevent a gamma processing to be described below to cause the loss of gradation in a highlight area and a shadow area.

Moreover, as described above, approximately equivalent luminance level correcting coefficients are determined for the pixels in the vicinity. Therefore, since the pixels in the vicinity are multiplied by approximately equivalent gains, the luminance level correction processing can be performed with the characteristics of the details maintained.

Subsequently, the luminance level correction processing unit 18 outputs the luminance-level corrected image data to the interpolation processing unit 19.

After the interpolation processing unit 19 classifies the luminance-level corrected image data into data of an edge area and data of a flat area so as to perform an interpolation processing thereon, and then outputs the interpolated image data to the color correction processing unit 20.

The color correction processing unit 20 performs a color correction processing on the interpolated image data by using a predetermined color correction coefficient, and then outputs the color-corrected image to the gamma processing unit 21.

The gamma processing unit 21 performs a gamma processing on the color-corrected image data by using a predetermined tone curve so as to output the gamma-processed image data through the compression unit 14 to the recording unit 15.

According to the first embodiment as described above, performing the luminance level correction processing prior to the gamma correction processing makes it possible to prevent the loss of gradation in a highlight area and a shadow area due to the gamma processing.

Furthermore, for the luminance level correction processing on each pixel, using the luminance level correcting coefficient obtained in consideration of the luminance distribution of the vicinity of the pixel makes it possible to maintain the characteristics of the details.

Second Embodiment

A second embodiment of the present invention will now be described with reference to the drawings. In the second embodiment, the description will be made only on the parts different from those of the first embodiment.

A digital still camera 2 according to the second embodiment includes an image-processing unit 25 in place of the image-processing unit 13 in the digital still camera 1 according to the first embodiment. Since the rest of the structure is similar to that of the first embodiment, the description and the illustration thereof are herein omitted. In the following description, the same components as those of the first embodiment are denoted by the same reference numerals in FIG. 1.

As the digital still camera 1, a program including the contents of an operation of each unit is pre-recorded in the digital still camera 2a.

Figure 7:
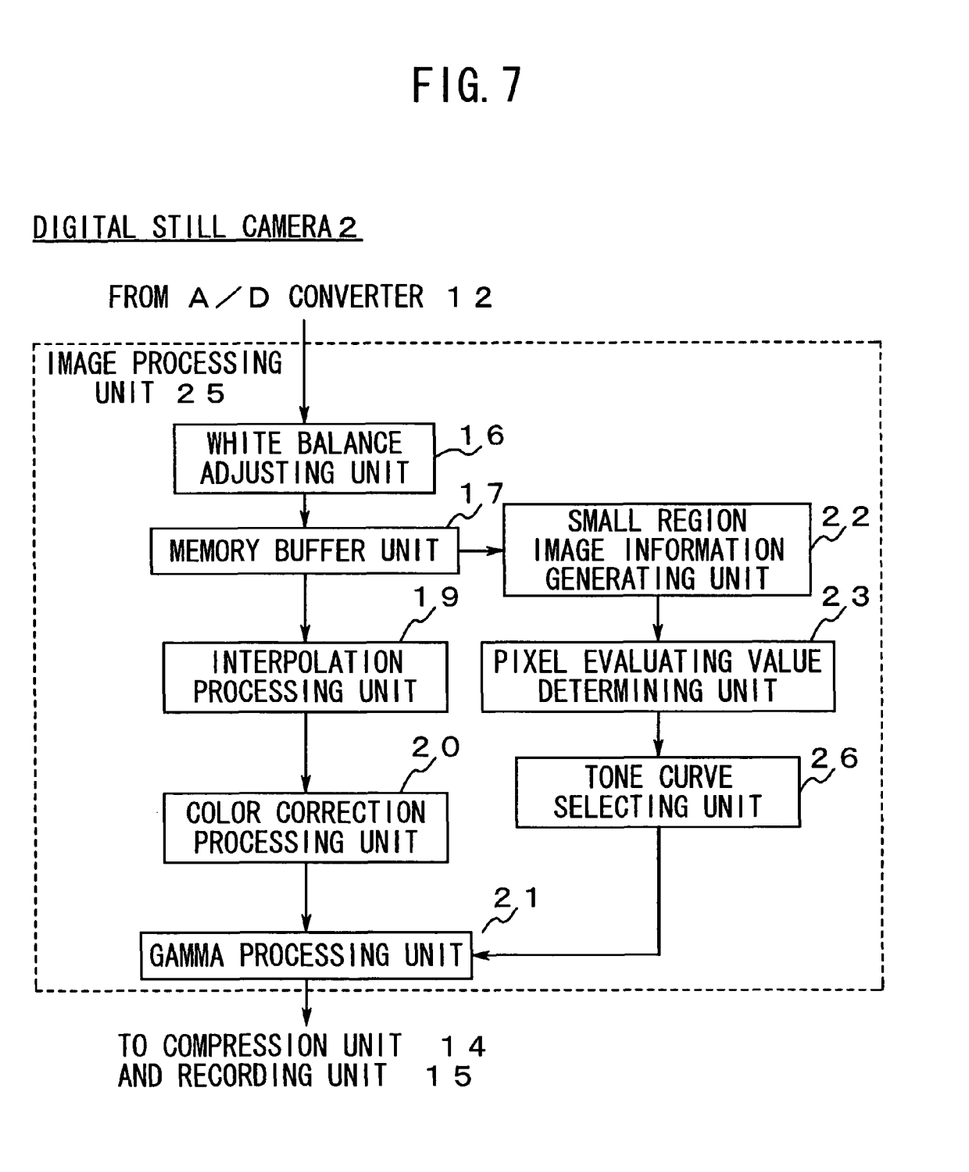
FIG. 7 is a functional block diagram of an image-processing unit in a digital still camera according to a second embodiment of the present invention.

FIG. 7 is a functional block diagram showing the image-processing unit 25 in the digital still camera 2 according to the second embodiment.

In FIG. 7, the image-processing unit 25 is not provided with the luminance level correction processing unit 18 and the luminance level correcting coefficient determining unit 24 of the image-processing unit 13 according to the first embodiment but is provided with a tone curve selecting unit 26 instead. Since the other components are similar to those of the first embodiment, they are denoted by the same reference numerals as those of the first embodiment.

An operation of the image-processing unit 25 will now be described.

In the image-processing unit 25, the white balance adjusting unit 16 performs the white balance adjustment in a similar manner to that in the first embodiment so as to output the white-balance adjusted image data to the memory buffer unit 17. The memory buffer unit 17 stores the white-balance adjusted image data, and then outputs the image data to the interpolation processing unit 19 and the small area image information generating unit 22 in synchronization with the xy address signal.

As in the first embodiment, the small area image information generating unit 22 calculates a luminance value for each small area. Then, the pixel evaluation value determining unit 23 calculates an evaluation value for each pixel. Subsequently, the pixel evaluation value determining unit 23 informs the tone curve selecting unit 26 of the calculated evaluation value.

The tone curve selecting unit 26 selects for each pixel a tone curve correlated with the evaluation value calculated by the pixel evaluation value determining unit 23, and then informs the gamma processing unit 21 of the selected tone curve.

Figure 8:
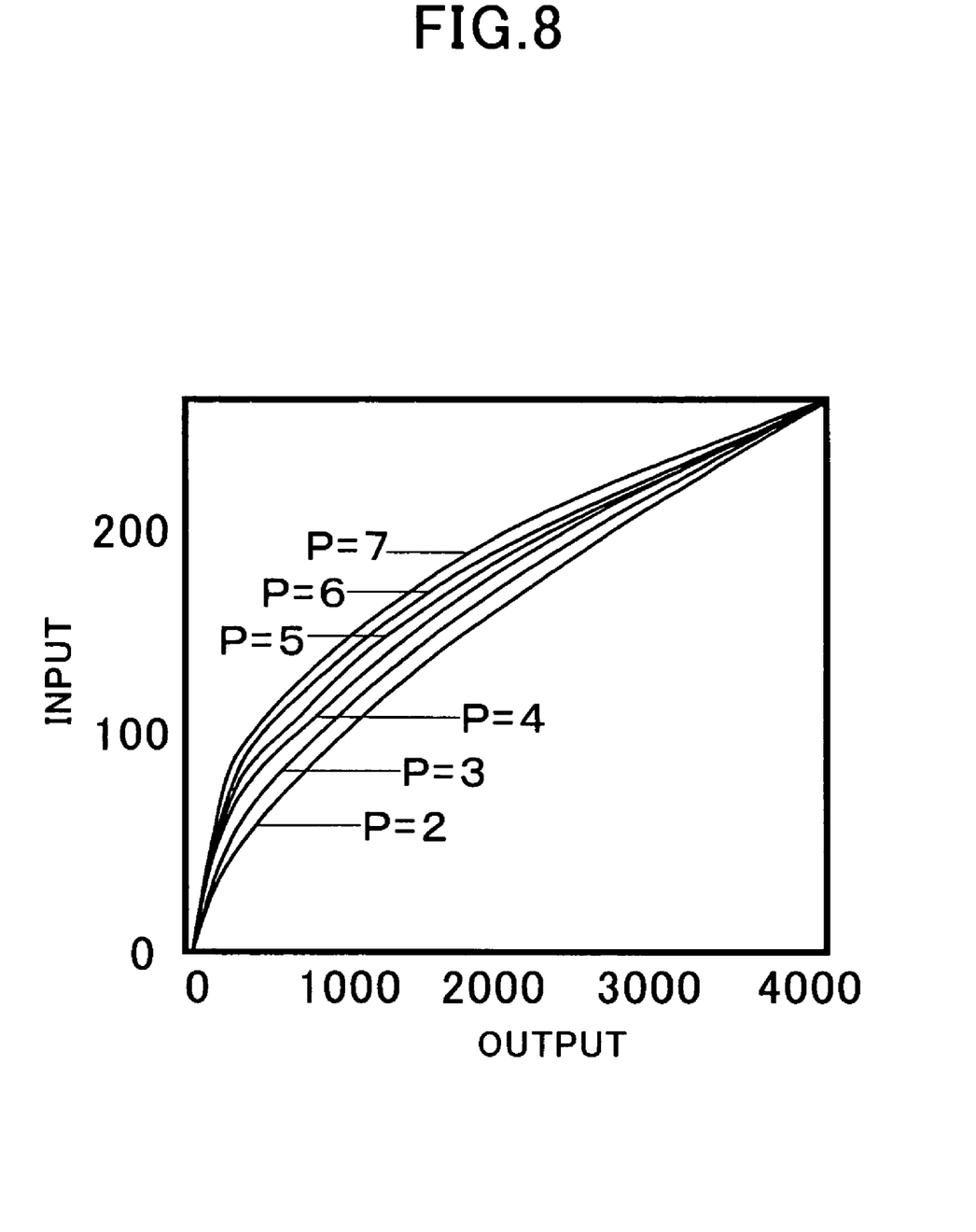
FIG. 8 is a diagram showing tone curves correlated with evaluation values.

FIG. 8 is a graph showing tone curves correlated with the evaluation values (P).

The gamma processing unit 21 performs a gamma processing on the image data which has been subjected to the interpolation processing and the color correction processing as in the first embodiment. Herein, the gamma processing unit 21 uses the tone curve informed by the tone curve selecting unit 26 to perform a gamma processing on each pixel. Subsequently, the gamma processing unit 21 outputs the image data after the gamma processing through the compression unit 14 to the recording unit 15.

As described above, according to the second embodiment, the evaluation value is calculated for each pixel based on the luminance information of the image. Then, the gamma processing is performed on each pixel by using the tone curve correlated with the calculated evaluation value. Therefore, similar effects to those of the first embodiment can be obtained.

Moreover, since the luminance level correction processing performed in the first embodiment is not required in this embodiment, a series of processings can be more quickly performed.

Third Embodiment

A third embodiment of the present invention will now be described with reference to the drawings. As in the second embodiment, the description will be made only on the parts different from those of the first embodiment in this embodiment.

A digital still camera 3 according to the third embodiment includes an image-processing unit 27 in place of the image-processing unit 13 in the digital still camera 1 according to the first embodiment. Since the rest of the structure is similar to that of the first embodiment, the description and the illustration thereof are herein omitted. In the following description, the same components as those of the first embodiment are denoted by the same reference numerals in FIG. 1.

As the digital still camera 1, a program including the contents of an operation of each unit is pre-recorded in the digital still camera 3.

Figure 9:
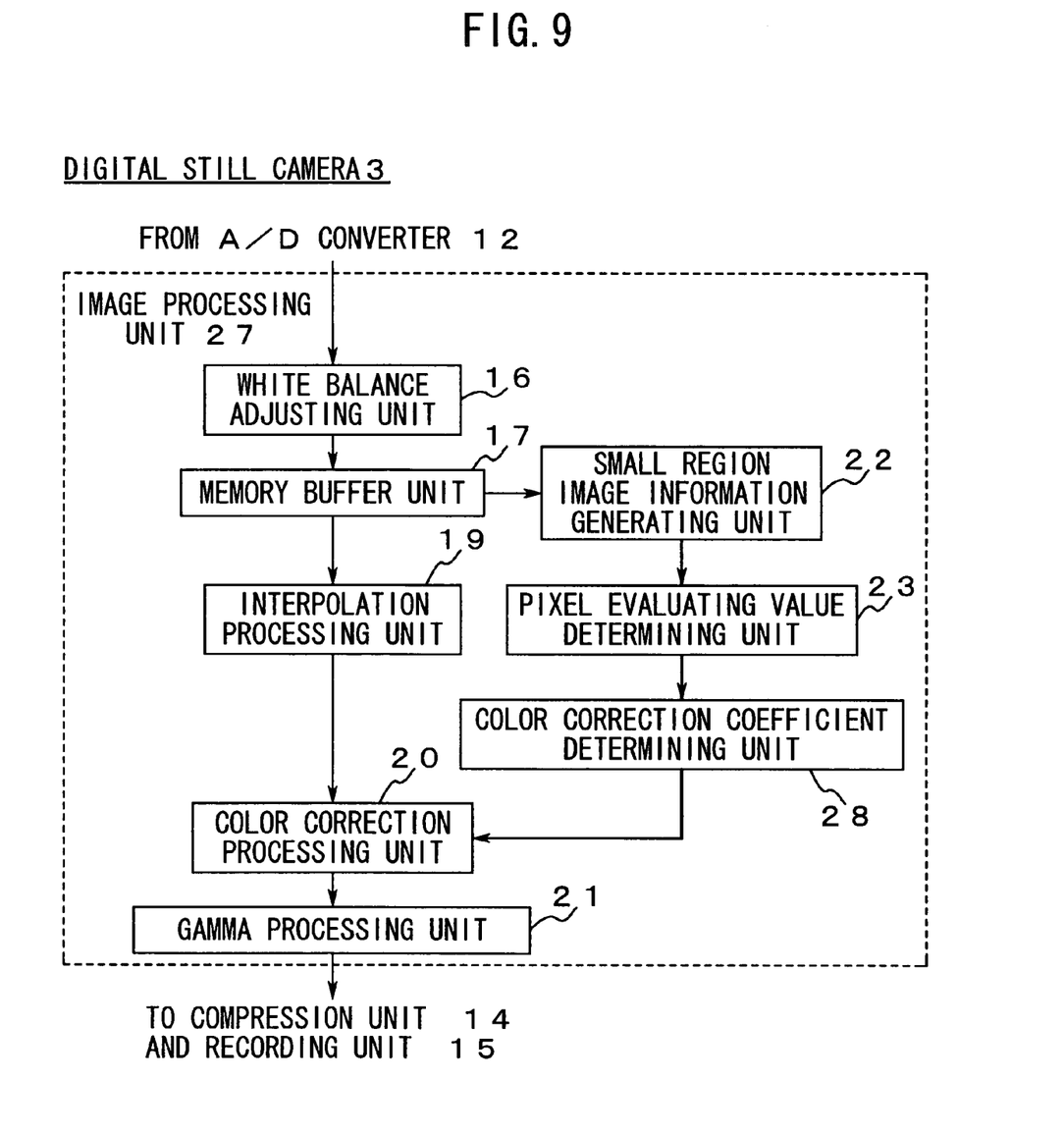
FIG. 9 is a functional block diagram showing an image-processing unit in a digital still camera according to a third embodiment of the present invention.

FIG. 9 is a functional block diagram showing the image-processing unit 27 in the digital still camera 3 according to the third embodiment.

In FIG. 9, the image-processing unit 27 is not provided with the luminance level correction processing unit 18 and the luminance level correcting coefficient determining unit 24 as the image-processing unit 13 in the first embodiment, but is provided with a color correction coefficient determining unit 28 instead. Since the other components are similar to those of the first embodiment, they are denoted by the same reference numerals as those of the first embodiment.

An operation of the image-processing unit 27 will now be described.

In the image-processing unit 27, the white balance adjusting unit 16 performs the white balance adjustment in a similar manner to that in the first embodiment so as to output the white-balance adjusted image data to the memory buffer unit 17. The memory buffer unit 17 stores the white-balance adjusted image data, and then outputs the image data to the interpolation processing unit 19 and the small area image information generating unit 22 in synchronization with the xy address signal.

Subsequently, as in the first embodiment, the small area image information generating unit 22 calculates a luminance value for each small area. Then, the pixel evaluation value determining unit 23 calculates an evaluation value for each pixel. Subsequently, the pixel evaluation value determining unit 23 informs the color correction coefficient determining unit 28 of the calculated evaluation value.

The color correction coefficient determining unit 28 selects for each pixel a color correction coefficient correlated with the evaluation value calculated by the pixel evaluation value determining unit 23, and informs the color correction processing unit 20 of the selected color correction coefficient.

Figure 10:
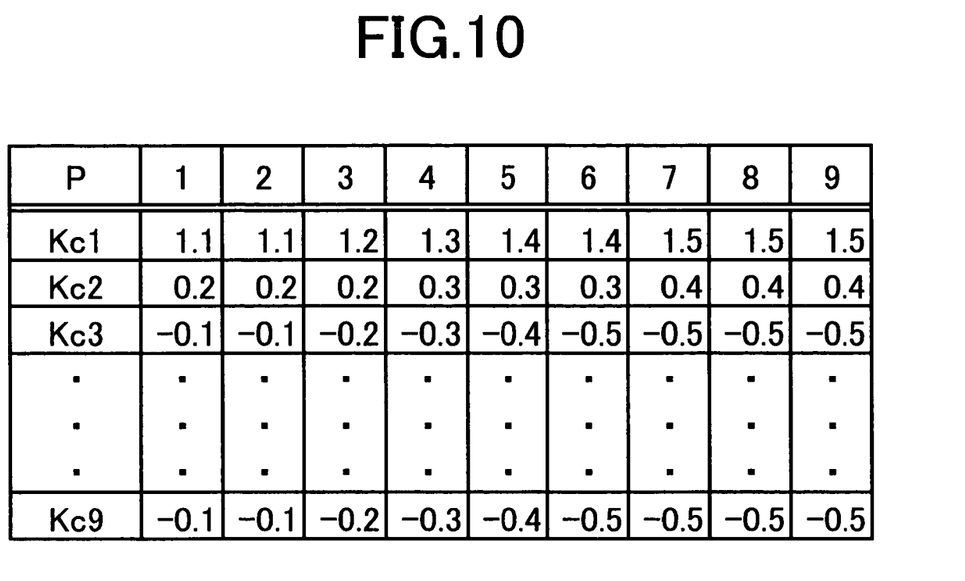
FIG. 10 is a table showing color correction coefficients correlated with evaluation values.

FIG. 10 is a table showing color correction coefficients correlated with the evaluation values (P). In FIG. 10, the color correction coefficients are represented as nine numerical values from Kc1 to Kc9. A matrix operation is performed by using these coefficients to realize the color correction processing.

The color correction processing unit 20 performs the color correction processing on the image data which have been subjected to the interpolation processing as in the first embodiment. Herein, the color correction processing unit 20 uses the following formulae to perform the color correction processing for each pixel, based on the color correction coefficients informed by the color correction coefficient determining unit 28.

$$R'=Kc1\times R+Kc2\times G+Kc3\times B \quad \text{(Formula 4)}$$

$$G'=Kc4\times R+Kc5\times G+Kc6\times B \quad \text{(Formula 5)}$$

$$B'=Kc7\times R+Kc8\times G+Kc9\times B \quad \text{(Formula 6)}$$

Where R, G, and B are image data of each color output from the interpolation processing unit 19, and R', G', and B' are image data of each color after the color correction processing.

Subsequently, the color correction processing unit 20 outputs the color corrected image data to the gamma processing unit 21.

The gamma processing unit 21 performs a gamma processing on the color corrected image data by using a predetermined tone curve as in the first embodiment. Subsequently, the gamma processing unit 21 outputs the image data after the gamma processing through the compression unit 14 to the recording unit 15.

As described above, according to the third embodiment, the evaluation value is calculated for each pixel based on the luminance information of the image. Then, the color correction processing is performed for each pixel by using the color correction coefficient correlated with the calculated evaluation value. Therefore, similar effects to those of the first embodiment can be obtained.

Moreover, since the luminance level correction processing performed in the first embodiment is not required in this embodiment, a series of processings can be more quickly performed.

Furthermore, since the color correction is performed by determining the color correction coefficient for each pixel, a more appropriate color correction processing can be performed as compared with the case where it is performed by using the same color correction coefficient for the entire image.

Fourth Embodiment

A fourth embodiment of the present invention will now be described with reference to the drawings. As in the second and third embodiments, the description will be made only on the parts different from those of the first embodiment in this fourth embodiment.

A digital still camera 4 according to the fourth embodiment includes an image-processing unit 29 in place of the image-processing unit 13 in the digital still camera 1 according to the first embodiment. Since the rest of the structure is similar to that of the first embodiment, the description and the illustration thereof are herein omitted. In the following description, the same components as those of the first embodiment are denoted by the same reference numerals in FIG. 1.

As the digital still camera 1, a program including the contents of an operation of each unit is pre-recorded in the digital still camera 4.

Figure 11:
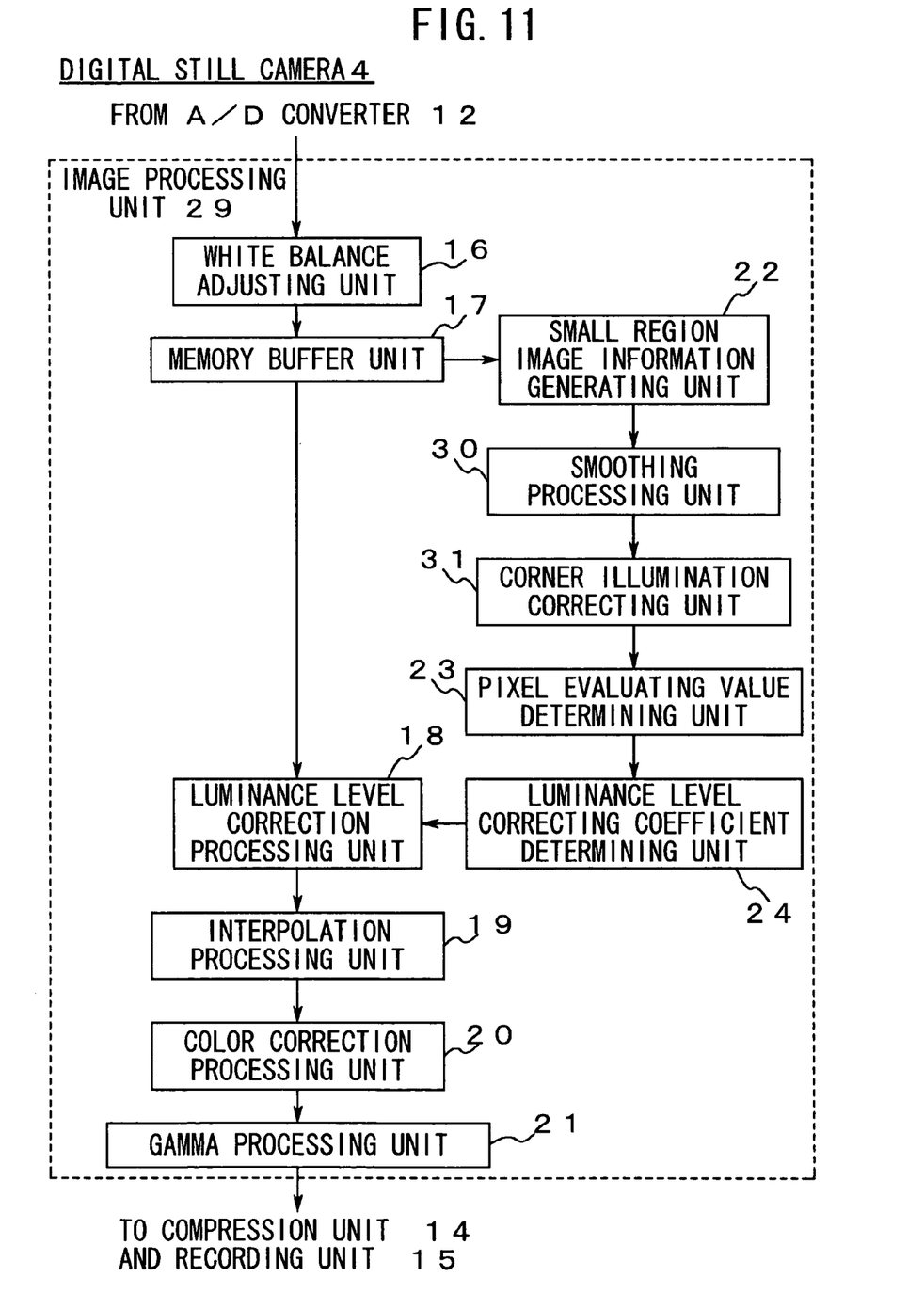
FIG. 11 is a functional block diagram of an image-processing unit in a digital still camera according to a fourth embodiment of the present invention.

FIG. 11 is a functional block diagram showing the image-processing unit 29 in the digital still camera 4 according to the fourth embodiment.

In FIG. 11, a smoothing processing unit 30 and a corner illumination correcting unit 31 are provided in the image-processing unit 29. Since the other components are similar to those of the first embodiment, they are denoted by the same reference numerals as those of the first embodiment.

An operation of the image-processing unit 29 will now be described.

In the image-processing unit 29, the white balance adjusting unit 16 performs the white balance adjustment in a similar manner to that in the first embodiment so as to output the white-balance adjusted image data to the memory buffer unit 17. The memory buffer unit 17 stores the white-balance adjusted image data, and then outputs the image data to the luminance level correction processing unit 18 and the small area image information generating unit 22 in synchronization with the xy address signal.

Subsequently, as in the first embodiment, the small area image information generating unit 22 calculates a luminance value for each small area. Then, the small area image information generating unit 22 informs the smoothing processing unit 30 of the luminance values representing the respective small areas.

The smoothing processing unit 30 performs a predetermined smoothing processing on the luminance value calculated for each of the small areas. In this embodiment, the smoothing is achieved by applying a predetermined weight onto the luminance values of eight adjacent small areas. Then, the smoothing processing unit 30 informs the corner illumination correcting unit 31 of the smoothed luminance value for each small area.

The corner illumination correcting unit 31 adds a corner illumination correction coefficient pre-recorded therein to the smoothed luminance value for each of the small areas so as to perform the corner illumination correction. By such corner illumination correction, it is able to correct low luminance of an area which is distant from the center of the lens.

The corner illumination correcting unit 31 informs the pixel evaluation value determining unit 23 of the luminance value for each small area after the corner illumination correction.

Figure 12:
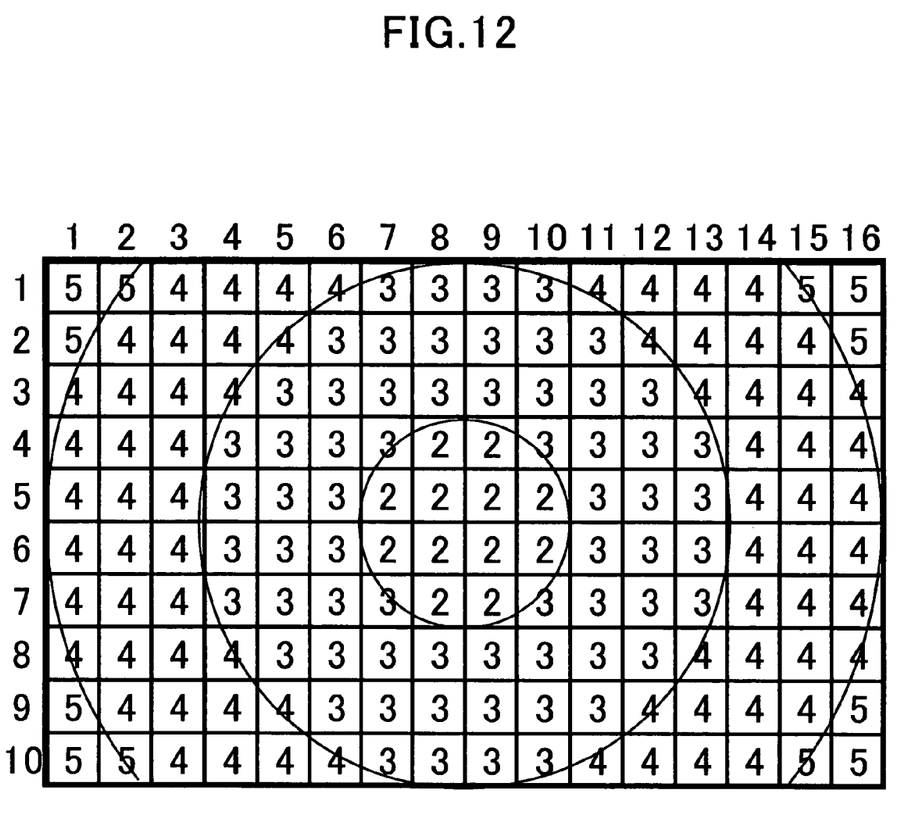
FIG. 12 is a table showing corner illumination correcting coefficients for the respective small areas, which are used for corner illumination correction.

FIG. 12 is a table showing corner illumination correction coefficients for the respective small areas, which are used for the corner illumination correction.

After the pixel evaluation value determining unit 23 calculates an evaluation value for each pixel based on the luminance value for each small area which has been subjected to the smoothing processing and the corner illumination correction processing as in the first embodiment, the pixel evaluation value determining unit 23 informs the luminance level correcting coefficient determining unit 24 of the calculated evaluation value.

Subsequently, the luminance level correcting coefficient determining unit 24, the luminance level correction processing unit 18, the interpolation processing unit 19, the color correction processing unit 20, the gamma processing unit 21, the compression unit 14, and the recording unit 15 perform the same processings respectively as those in the first embodiment.

As described above, according to the fourth embodiment, the smoothing processing is performed on the luminance value of each small area calculated by the small area image information generating unit 22. This can prevent occurrence of false contours at the boundaries between the adjacent small areas due to the luminance level correction processing.

Furthermore, since the corner illumination correction processing is performed on the luminance value for each small area calculated by the small area image information generating unit 22, in addition to the effects of the first embodiment further effects are obtainable by the corner illumination correction in accordance with the photo-taking lens used for shooting the image to be processed.

The smoothing processing and the corner illumination correction processing described in the fourth embodiment can be used in the digital still cameras according to the second embodiment and the third embodiment.

Moreover, although the smoothing of this embodiment is performed by applying a predetermined weight on the luminance values of eight adjacent small areas, other smoothing methods may also be used.

Although each of the above embodiments describes an example where the small area image information generating unit 22 divides the image in 10 rows in the longitudinal direction and 16 columns in the horizontal direction, the number of division can be any number or may be set by a user.

Although each of the above-described embodiments describes the digital still camera, the present invention is not particularly limited to thereto, any equipment can be used as long as it can perform an image processing for correcting the luminance level of the image to be processed. For example, the present invention is applicable to an image-processing system including a personal computer, a display, and the like. In case of personal computer, however, it has preinstalled therein an image-processing program for executing an image processing as the image-processing unit of the digital still camera according to any one of the above-described embodiments. The image-processing program is downloaded through a recording medium such as a CD-ROM or through the Internet.

What is claimed is:

1. An image-processing device comprising:
an image information generating part for dividing captured image data consisting of a signal having a plurality of data values of a plurality of pixels into a plurality of small areas, said small areas each consisting of a plurality of the pixels, and for generating, for each of said small areas, image information indicating a characteristic of the captured image data;
a luminance value determining part for determining a luminance value indicating luminosity for each of the plurality of small areas of the captured image data;
an evaluation value determining part for calculating an evaluation value for each of the plurality of pixels, the evaluation value being calculated by selecting two or more small areas, including an area having the pixel for which the evaluation value is calculated and an other area having shorter distances to a pixel for which the evaluation value is being calculated from each of the plurality of pixels, and calculating the evaluation value for each pixel by inputting the respective luminance values of the selected small areas and a distance value from each pixel to each small area selected into a formula; and
an image-processing part for performing correction on each of the pixels of the captured image data according to the evaluation value determined by said evaluation value determining part.

2. The image-processing device according to claim 1, wherein
said image-processing part includes a luminance level correcting part for correcting a luminance level of the captured image data; and said luminance level correcting part determines a luminance level correcting coefficient used for the luminance level correction according to the evaluation value for each of said pixels determined by said evaluation value determining part so as to perform the luminance level correction processing by multiplying the coefficient with the evaluation values for each of said pixels of the captured image data.

3. The image-processing device according to claim 1, wherein
said evaluation value determining part performs a smoothing processing on the image information for each of said small areas generated by said image information generating part and determines the evaluation value according to the smoothed image information for each of the said small areas.

4. The image-processing device according to claim 1, wherein
said evaluation value determining part performs a pre-correction processing to correct low luminance of a corner illumination on the image information for each of said small areas generated by said image information generating part in accordance with a characteristic of a photo-taking lens used for generating the captured image data, and then determines the evaluation value according to the pre-corrected image information for each of said small areas.

5. The image-processing device according to claim 1, wherein
said evaluation value determining part determines the evaluation value by weighting the image information for each of said small areas in accordance with a ratio of distances from a pixel as a subject for the evaluation-value determination to a predetermined point in each of said small areas whose image information is to be referred to for the evaluation-value determination.

6. A digital still camera comprising:
an image-capturing part for capturing a subject to generate captured image data consisting of a signal having a plurality of data values of a plurality of pixels;
an image information generating part for dividing the captured image data generated by said image-capturing part into a plurality of small areas, said small areas each consisting of a plurality of the pixels, and for generating, for each of said small areas, image information indicating a characteristic of the captured image data;
a luminance value determining part for determining a luminance value according to the image information generated for each of said small areas and to the image information generated for each of small areas adjacent to the each of said small areas, the luminance value indicating luminosity of each of the pixels constituting the captured image data;
an evaluation value determining part for calculating an evaluation value for each of the plurality of pixels, the evaluation value being calculated by selecting two or more small areas, including an area having the pixel for which the evaluation value is calculated and an other area having shorter distances to a pixel for which the evaluation value is being calculated from each of the plurality of pixels, and calculating the evaluation value for each pixel by inputting the respective luminance values of the selected small areas and a distance value from each pixel to each small area selected into a formula; and
an image-processing part for performing correction on each of the pixels of the captured image data according to the evaluation value determined by said evaluation value determining part.

7. The digital still camera according to claim 6, further comprising a divisional photometry part for dividing a subject field into a plurality of photometry areas and performing photometry for each of the photometry areas, wherein
said image information generating part generates the image information based on information obtained from said divisional photometry part.

8. A a non-transitory computer-readable storage medium having computer-executable instructions for performing steps comprising:
dividing captured image data consisting of a signal having a plurality of data values of a plurality of pixels into a plurality of small areas, said small areas each consisting of a plurality of the pixels, and for generating, for each of said small areas, image information indicating a characteristic of the captured image data;
determining a luminance value according to the image information generated for each of said small areas and the image information generated for each of small areas adjacent to the each of said small areas, the luminance value indicating luminosity of each of the pixels constituting the captured image data;
calculating an evaluation value for each of the plurality of pixels, the evaluation value being calculated by selecting two or more small areas, including an area having the pixel for which the evaluation value is calculated and another area having shorter distances to a pixel for which the evaluation value is being calculated from each of the plurality of pixels, and calculating the evaluation value for each pixel by inputting the respective luminance values of the selected small areas and a distance value from each pixel to each small area selected into a formula; and
performing correction on each of the pixels of the captured image data according to the evaluation value determined in the evaluation-value calculating step.

* * * * *